E. GRAF.
SAFETY SPRING WINDING MECHANISM.
APPLICATION FILED JULY 26, 1916.

1,217,746.

Patented Feb. 27, 1917.

Inventor
Emil Graf,
By his Attorneys
Kenyon & Kenyon

UNITED STATES PATENT OFFICE.

EMIL GRAF, OF NEW YORK, N. Y., ASSIGNOR, BY MESNE ASSIGNMENTS, TO JAMES MANOIL COMPANY, INC., OF NEW YORK, N. Y., A CORPORATION OF NEW YORK.

SAFETY SPRING-WINDING MECHANISM.

1,217,746.      Specification of Letters Patent.      Patented Feb. 27, 1917.

Application filed July 26, 1916. Serial No. 111,371.

*To all whom it may concern:*

Be it known that I, EMIL GRAF, a citizen of Switzerland, and a resident of the city of New York, county and State of New York, have invented certain new and useful Improvements in Safety Spring-Winding Mechanism, of which the following is a specification.

My invention relates to spring-winding mechanism, and more particularly to a safety spring-winding device that prevents the overwinding of a spring.

One of the objects of the invention is to provide a device of this kind particularly adapted for use in winding phonographs. The springs of these devices are more or less delicate, and the uniform speed of the record, which is an important feature, is more or less affected by the overwinding of the spring. Such overwinding not only impairs the durability of the spring, but renders the speed of the record ununiform, and on account of these and other delicate features in such apparatus, it is important to provide means for preventing the overwinding of the driving spring.

Another object of the invention is to provide means of this general character conveniently located with respect to the usual shaft and spring-winding crank, and of durable and efficient form.

My invention consists in the features and combinations hereinafter described in their preferred form, and the invention is more particularly pointed out in the appended claims.

Figure 1:
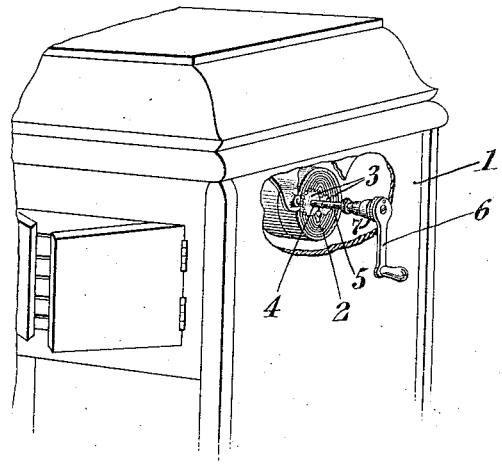
Figure 2:
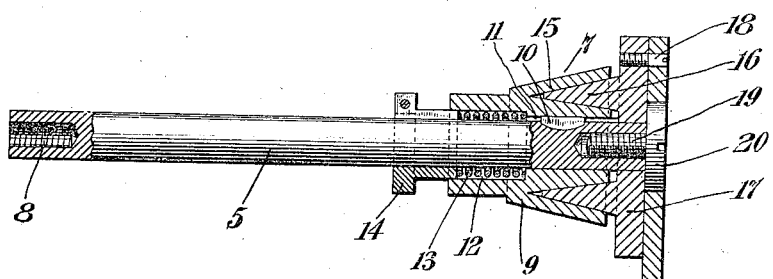

Further objects and advantages of the invention will more fully appear from the following description taken in connection with the accompanying drawings showing the preferred form of the invention, and in which Figure 1 is a perspective view of a phonograph cabinet equipped with my invention; and Fig. 2 is an enlarged side view, partly in section, of the form of the invention shown in Fig. 1.

Referring to the drawings, Fig. 1 shows a phonograph cabinet 1 having contained therein a spring 2 adapted to be wound by any suitable gearing illustrated at 3 and driven by a main shaft 4, to which is preferably removably secured in any suitable manner a winding shaft 5 which is rotated by a crank 6 through the interposition of my safety device 7.

In Fig. 2 the winding shaft 5 is shown as detachably secured to the shaft 4 by means of a threaded recess 8 adapted to be threaded onto suitable threads (not shown) on shaft 4, so that the shaft 5 is removable from the shaft 4 but when screwed thereon is intended to rotate therewith.

The preferred form of my safety device as shown in these drawings, takes the form of a friction clutch, consisting of a friction clutch member 9 secured to shaft 5 by a key 10 and a groove 11, so that this member is rotatable with the shaft but slidable longitudinally thereof. This clutch member is provided with a housing or chamber 12 for containing a spring 13 having one end abutting against the end of the housing and having its other end abutting against any suitable device such as a split sleeve 14 rigidly and preferably adjustably secured to the shaft. This friction clutch member is provided with one or more tapering or inclined friction surfaces preferably taking the form of an annular V-shaped groove 15 concentric to the shaft 5, into which fits an annular V-shaped friction clutch member 16 having surfaces in frictional engagement with those of the groove 15. This second friction clutch member 16 is formed on a plate 17 secured in any suitable manner such as by pins 18 to the crank 6, and the crank is held in position on the end of shaft 5 rotatable with respect to the shaft in any suitable manner, such as by means of a screw 19 threaded into the end of the shaft and having an annular head 20 fitting loosely into a recess in the enlarged portion of the crank.

It will be seen from this construction that, as the crank is rotated, if it were not for the friction surfaces, it would move freely about the axis of the shaft 5; but that, due to the fact that the spring 13 is normally forcing the friction engaging surfaces of the two clutch members into engagement, the shaft 5 will be rotated by the crank 6 and will continue to rotate with it until the resistance to the rotation of shaft 5 is so great that the inclined engaging friction surfaces of the clutch will cause the yieldable clutch member 9 to be forced away from the crank end of the shaft 5 against the pressure of the spring 13, thus preventing further rotation of the shaft 5. It will be seen from this that after it has been determined to what extent it is desirable to wind the driving spring, the cluch can be so adjusted that it will not transmit sufficient force to rotate shaft 5 after this limit has been reached, and this adjustment may be had in any suitable manner such as by the size or character of the spring 13 to be used, or by the adjustment of the split sleeve 14 along the length of the shaft with any given spring.

It will be obvious to those skilled in the art, after understanding my invention, that various changes and modifications may be made therein without departing from the spirit or scope of the invention, and I do not wish to be understood as limiting myself other than as indicated in the appended claims.

Having thus described my invention, what I claim as new and desire to secure by Letters Patent, is:—

1. In a phonograph, the combination of a main driving spring, a rotatable driven shaft for winding the spring, a rotatable driving member whose axis of rotation is concentric to the shaft, a friction clutch having two relatively rotatable clutch parts with concentric tapering friction engaging surfaces, said clutch parts being concentric to the axis of rotation of the driven shaft and driven member and being non-yieldable laterally, one being carried on the driven shaft to rotate therewith and the other on the driving member to rotate therewith, one of said friction parts being mounted to yield bodily longitudinally of its axis of rotation, and means including a spring for thrusting said longitudinally yielding friction part into engagement with the other friction part, said spring being adjusted to yield to allow longitudinal movement of one of said parts and slipping between them when more than the predetermined amount of torque to be transmitted by the clutch is applied to the driving member and to automatically take up the wear of the friction parts and automatically maintain substantially the desired capacity of the clutch for frictional transmission of power from one part to the other.

2. In spring-winding mechanism for phonographs, the combination of a spring-winding rotatable shaft, a friction clutch comprising two inter-fitting friction members having tapering annular friction engaging surfaces, one of said members being secured to rotate with the shaft but slidable longitudinally on the same, a crank secured rotatably on the shaft and having the other friction member secured to rotate therewith, a spring on the shaft for normally holding the friction engaging surfaces of the clutch members in operative engagement, and adapted to yield to permit relative longitudinal movement and slipping between the friction surfaces to prevent overwinding of the spring driven by the shaft and to automatically compensate for the wear of the friction surfaces and to automatically maintain substantially the desired power transmission capacity of the clutch.

3. In spring-winding mechanism for phonographs, the combination of a spring-winding rotatable shaft, a crank rotatably mounted on the end of said shaft and having an annular friction member with tapering friction engaging surfaces secured to said crank and disposed concentric about said shaft, a second friction clutch member having an annular groove therein V-shape in section to receive the friction surface on the crank, said second friction clutch member being mounted to rotate on the shaft but movable longitudinally thereof with respect to the first friction clutch member, a housing formed within the second friction clutch member for receiving a spring, and means on the shaft against which one end of the spring rests, whereby the friction clutch members are normally held in engagement with one another and are permitted to slip one on the other when said last-mentioned spring yields to prevent overwinding of the spring driven by the shaft.

In testimony whereof, I have signed my name to this specification.

EMIL GRAF.